US007113301B2

(12) United States Patent
Su (10) Patent No.: US 7,113,301 B2
(45) Date of Patent: Sep. 26, 2006

(54) SYSTEM AND METHOD FOR AUTOMATED ACCESS OF A NETWORK PAGE

(75) Inventor: Jason T. Su, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 807 days.

(21) Appl. No.: 10/001,411

(22) Filed: Oct. 31, 2001

(65) Prior Publication Data

US 2003/0081243 A1 May 1, 2003

(51) Int. Cl.
  *G06F 15/00* (2006.01)
  *G06F 3/00* (2006.01)
  *G06F 7/00* (2006.01)

(52) U.S. Cl. ............... 358/1.15; 358/1.12; 358/450; 709/217; 707/9; 707/10; 707/205; 715/704; 715/738

(58) Field of Classification Search ............... 358/1.15, 358/1.12, 450; 709/217, 100; 715/738, 715/704; 707/9, 10, 205
See application file for complete search history.

(56) References Cited

U.S. PATENT DOCUMENTS 5,754,308 A * 5/1998 Lopresti et al. ............. 358/403
5,809,250 A * 9/1998 Kisor .......................... 709/227
5,920,696 A    7/1999 Brandt et al.
6,195,679 B1 * 2/2001 Bauersfeld et al. ......... 709/203
6,381,637 B1   4/2002 Kamada
2002/0054090 A1 * 5/2002 Silva et al. .................. 345/747
2002/0152159 A1 * 10/2002 Khan et al. ................... 705/39
2002/0162120 A1   10/2002 Mitchell

FOREIGN PATENT DOCUMENTS

GB    2 328 300        2/1999
WO    WO 00/76204    12/2001

OTHER PUBLICATIONS

V. Anupam et al., Automating Web Navigation with the WebVCR, Bell Laboratories, Mar. 1, 2000, pp. 1-22.*

* cited by examiner

*Primary Examiner*—Douglas Q. Tran
*Assistant Examiner*—Chan S. Park (57) ABSTRACT

Various systems, methods, and programs embodied in computer readable medium are provided to facilitate automated data access for online printing. In one embodiment, an automated data access method is provided that comprises the steps of identifying a content item to be accessed for a publication, identifying an event sequence associated with the content item that is employed to access the content item, and reproducing the events of the event sequence to obtain access to the content item.

24 Claims, 4 Drawing Sheets

SYSTEM AND METHOD FOR AUTOMATED ACCESS OF A NETWORK PAGE

TECHNICAL FIELD

The present invention is generally related to the field of data access and, more particularly, is related to a system and method for automated access of a network page.

BACKGROUND

Online printing presents an alternative to traditional paper publishing and provides many benefits. Specifically, traditional paper publishing requires adequate production facilities to produce the paper publications. Such publications may be newspapers, magazines, and the like. In other situations, companies that provide consumer services may print bills that are mailed on a monthly basis. For example, such bills might include utility bills, bank statements, credit card bills, or other periodic bills. The production facilities that are necessary to generate paper publications are typically operated at significant cost. In addition, delivery of the publications may also incur significant cost.

Online printing virtually eliminates production and delivery costs for paper publications. Specifically, publications may be posted as a web page on the Internet that is accessed by a user through a client device. For example, rather than mailing a monthly power bill to a customer, the utility company might simply post the bill on a web page that is then accessed by the user. The user may then print out the bill on a local printer and pay it accordingly.

Alternatively, automated online publishing systems such as instant-delivery.com™ by Hewlett Packard of San Jose, Calif. may independently access a bill or other content posted on a web page, format the content for printing, and then send the formatted bill to a client machine for printing without any action on the part of a user. However, a problem arises in that individuals usual desire a degree of privacy when it comes to online bills and the like. Specifically, users who access their bills or other publications online may be required to enter a password or overcome some other security hurdle. Automated online publishing systems lack the ability to navigate through such hurdles and, consequently, the protected content cannot be accessed and printed by such systems.

SUMMARY

In light of the forgoing, the present invention provides for systems, methods, and programs embodied in computer readable medium to facilitate automated data access for online printing. In one embodiment, an automated data access method is provided that comprises the steps of identifying a content item to be accessed for a publication, identifying an event sequence associated with the content item that is employed to access the content item, and reproducing the events of the event sequence to obtain access to the content item.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
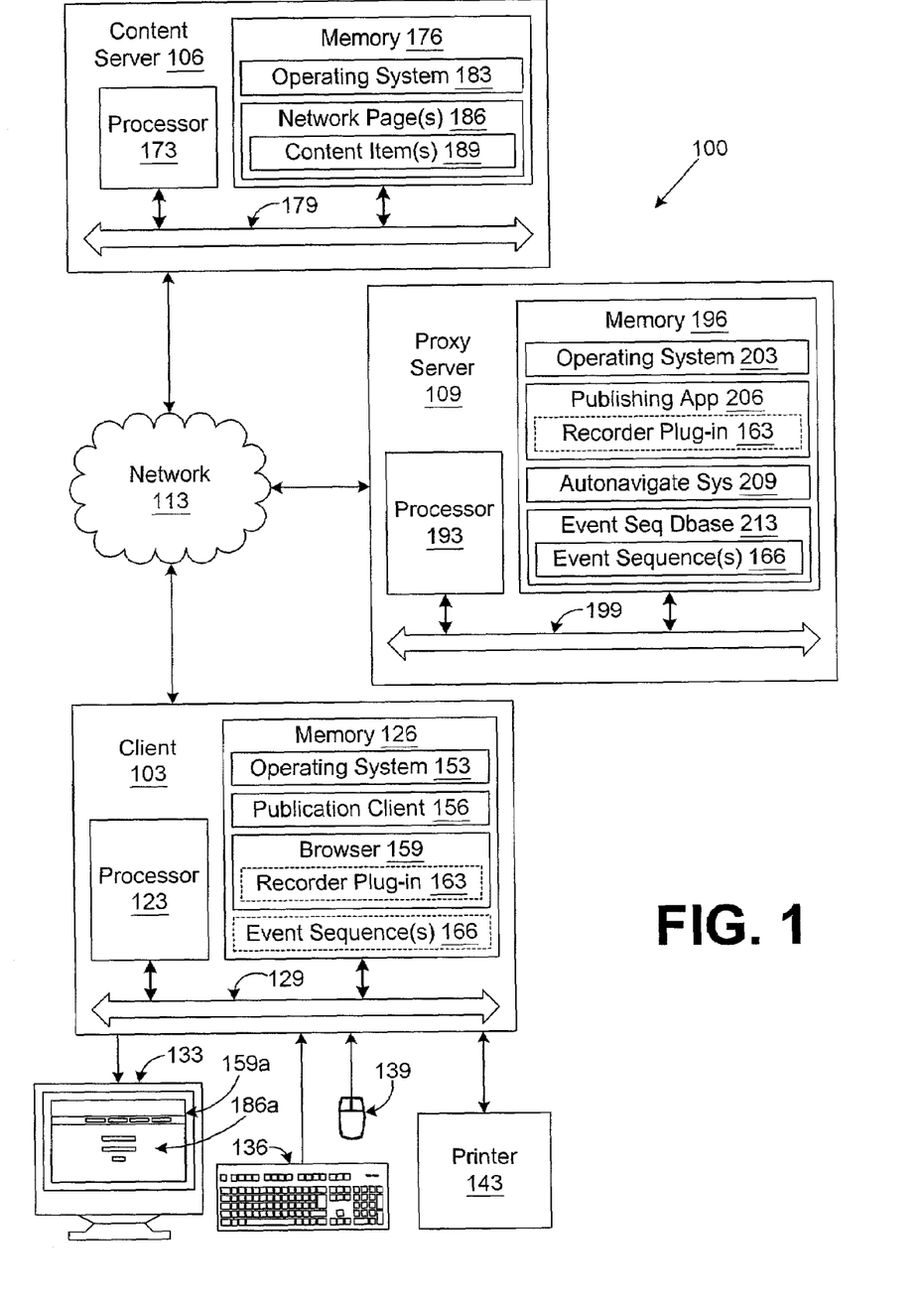
FIG. 1 is a block diagram of an online printing network that includes a client, content server, and a proxy server according to an aspect of the present invention.

With reference to FIG. 1, shown is an automated online printing network 100 according to an aspect of the present invention. The automated online printing network 100 includes a client 103, a content server 106, and a proxy server 109, all of which are coupled to a network 113. The network 113 may be, for example, the Internet, intranets, wide area networks (WANs), local area networks, wireless networks, or other suitable networks, etc., or any combination of two or more such networks.

The client 103, may comprise, for example, a computer system or other device with like capability. In this respect, the client 103 includes a processor circuit with a processor 123 and a memory 126, both of which are coupled to a local interface 129. The local interface 129 may comprise, for example, a data bus with an accompanying control/address bus as is generally known by those with ordinary skill in the art. The client 103 may also include a display device 133, a keyboard 136, a mouse 139, and a printer 143. In addition, the client 103 may include other peripheral devices such as, for example, keypad, touch pad, touch screen, microphone, scanner, joystick, or one or more push buttons, etc. The peripheral devices may also include indicator lights, speakers, etc. The display device 133 may be, for example, cathode ray tubes (CRTs), liquid crystal display screens, gas plasma-based flat panel displays, or other types of display devices, etc.

The client 103 includes several software components that are stored on the memory 126 and are executable by the processor 123. These components include an operating system 153, a publication client 156, and a browser 159. The browser 159 may be employed to access various network pages that are made available on servers coupled to the network 113 as can be appreciated by those with ordinary skill in the art. Upon execution on the client 103, the browser 159 generates a browser graphical user interface 159a. In addition, according to one aspect of the present invention, the browser 159 executes a recorder plug-in 163 that is downloaded from the proxy server 109. Upon execution by the browser 159, the recorder plug-in 163 generates one or more event sequences 166 that are transmitted to the proxy server 109 and stored therein as will be discussed.

The content server 106 may also comprise, for example, a computer system or other system with like capability. In this respect, the content server 106 includes a processor circuit having a processor 173 and a memory 176, both of which are coupled to a local interface 179. The local interface 179 may be, for example, a data bus with an accompanying control/address bus as is generally known by those with ordinary skill in the art.

The content server 106 also includes various software components that are stored in the memory 176 and are executable by the processor 173. These components may include, for example, an operating system 183. Also, the content server 106 may include server software that operates according to the protocol of the network 113 that allows the content server 106 to serve up one or more network pages 186 to one or more clients 103. Such a protocol may be, for example, HyperText Transfer Protocol or other protocol as is generally known by those with ordinary skill in the art. Each of the network pages 186 may include one or more content items 189 as can be appreciated by those with ordinary skill in the art. The content items 189 may be text, graphics, images, audio files, and other information. In addition, the content server 106 may include peripheral devices similar to the client 106, etc.

A user may manipulate the browser 159 on the client 103 to access one or more of the network pages 186 that are displayed as a network page 186a on the display device 133 within the browser graphical user interface 159a. A user may be required to provide authentication information such as a password in order to be able to access one of the network pages 186.

The proxy server 109 may also be a computer system or other device with like capability. In this respect, the proxy server 109 includes a processor circuit with a processor 193 and a memory 196, both of which are coupled to a local interface 199. In this respect, the local interface 199 may be, for example, a data bus with an accompanying control/address bus as can be appreciated by those with ordinary skill in the art.

The proxy server 109 includes several software components that are stored on the memory 196 and are executable by the processor 193. These components may compromise, for example, an operating system 203 and a publishing application 206. The publishing application 206 may include the recorder plug-in 163 that is downloaded to the client 103 and executed by the browser 159 at appropriate times as will be discussed. Generally speaking, the publishing application 206 performs operations necessary to provide for automated online publishing.

The proxy server 109 also includes the auto-navigate system 209 and an event sequence database 213. The auto-navigate system 209 is employed to access select ones of the network pages 186 that require authentication of a user or require some other hurdle to be overcome before access is provided thereto. In doing so, the auto-navigate system 209 may employ one or more event sequences 166 that are stored within the event sequence databases 213 as will be discussed. In addition, the proxy server 109 may include peripheral devices similar to the client 106, etc.

Each of the memories 126, 176, and 196 are defined herein as both volatile and nonvolatile memory and data storage components. Volatile components are those that do not retain data values upon loss of power. Nonvolatile components are those that retain data upon a loss of power. Thus, each of the memories 126, 176, and 196 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 123,173, and 193 may represent multiple processors and each of the memories 126, 176, and 196 may represent multiple memories that operate in parallel processing circuits, respectively. In such a case, each of the local interfaces 129, 179, and 199 may be an appropriate network that facilitates communication between any two of the multiple processors, between any processor and any of the memories, or between any two of the memories, etc. The processors 123,173, and 193 may be electrical or optical in nature.

The operating systems 153, 183, and 203 are executed to control the allocation and usage of hardware resources in the client 103, content server 106, and the proxy server 109 such as the memory, processing time and peripheral devices. In this manner, the operating systems 153, 183, and 203 serve as the foundation on which applications depend as is generally known by those with ordinary skill in the art.

Next a discussion of the operation of the automated online printing network 100 is provided with regard to a typical automated publishing experience. Specifically, the publication client 156 on the client 103 performs local printing tasks on the printer 143 upon receiving a formatted online publication from the publishing application 206 on the proxy server 109. To generate the formatted online publication, the publishing application 206 obtains various content items 189 from various network pages 186 or may obtain content items 189 from databases, etc., that are accessible by the proxy server 109. The content items 189 may be, for example, articles, images, or other media.

The publishing application 206 then formats the content items 189 into an online publication that is transmitted to the client 103 for printing by the publication client 156. In response, the publication client 156 causes the printing of the online publication onto the printer 143. In addition, the publication client 156 may periodically generate requests for the respective online publications that are transmitted to the publishing application 206. Alternatively, the publishing application 206 may generate such a request internally. In response to the request, the publishing application 206 generates the online publication and transmits the same to the client 103. The request may contain a reference to the content items 189 (and the corresponding network pages 186) to be accessed. Alternatively, the request may include a reference to a content list stored in the proxy server 109 that lists the content items 189 and the network pages 186 to be accessed. Thus, the publishing application 206 identifies the network pages 186 and the corresponding content items 189 to be accessed by examining the request and/or content list associated with the request.

For discussion related to a system that performs many of the tasks of the publishing application 206, reference is made to co-pending U.S. patent application entitled "DOCUMENT DELIVERY SYSTEM FOR AUTOMATICALLY PRINTING A DOCUMENT ON A PRINTING DEVICE" that was filed on Jun. 7, 1999 and assigned Ser. No. 09/325,040, the text and drawings of which are incorporated herein by reference in their entirety.

Given that the publishing application 206 accesses the various network pages 186 to obtain the content items 189 for an online publication that is then transmitted to the client 103, it may be the case that some network pages 186 are not directly accessible by the publishing application 206. As a consequence, the publishing application 206 is prevented from automatically generating the online publication that includes the content items 189 in the respective network page 186.

For example, a user's monthly telephone bill may be available on a network page 186, where the content items 189 include the substance of the telephone bill including calls made, etc. Due to privacy concerns, a user may be required to enter authentication information such as a password or other identity information before access is provided to one or more network pages 186 that display the telephone bill. In this manner, unauthorized access to the details of an individual's calling history are prevented. However, the privacy measures may eclipse the ability of a publishing application 206 to generate an online publication that is sent to the client 103 to be printed automatically by the publication client 156 on the printer 143.

To address this problem, first a user identifies network pages 186 that are to be accessed to obtain the content items 189 for an online publication. When each network page 186 is identified, the publishing application 206 identifies inaccessible ones of the network pages 186 that require authentication or present other access hurdles to be overcome. For each of these network pages 186, the publishing application 206 downloads the recorder plug-in 163 to the client 103 for execution by the browser 159.

A selection of an inaccessible network page 186 on the part of the publishing application 206 may be determined by attempting to access the selected page independently with the publishing application 206 itself. If the attempt is unsuccessful, then the recorder plug-in 163 is downloaded to the client 103 for execution by the browser 159 with instructions to generate an event sequence 166 as will be discussed.

Upon execution of the recorder plug-in 163 by the browser 159, the recorder plug-in 163 generates various components in the browser graphical user interface 159a. These components allow a user to record an event sequence 166 that comprises events that take place when a user obtains access to a desired network page 186 to obtain access to content items 189 associated therewith. The events may be, for example, keystrokes on the keyboard 163, movement of a cursor on the display device 133 using the mouse 139, or manipulation of various elements in a respective network page 186, as well as other events, etc. While the user accesses the desired network page(s) 186, the recorder plug-in 163 records the various events that occur. Ultimately, the events are compiled into an event sequence that is temporarily stored in the memory 126. Once the entire event sequence 166 has been recorded, the event sequence 166 is transmitted to the proxy server 109 and is stored in the event database 213 for future access.

The event sequence 166 is associated with the respective network page(s) 186 that the user wished to access by placing the uniform resource identifier(s) into the event sequence 213. Alternatively, any request for an online publication to be generated by the publishing application 206 may include a reference to the respective event sequence(s) 213 that are to be employed to access the desired content items 189 in the respective network pages 186.

Assuming that a respective event sequence 166 has been stored in the event sequence database 213, then the publishing application 206 can access the restricted network page(s) 186. In doing so, the publishing application 206 calls or executes the auto-navigate system 209. Once executed, the auto-navigate system 209 examines the event sequence database 213 to obtain the respective event sequence 166 that is associated with the respective online publication to be generated. The auto-navigate system 209 then reproduces the events in the event sequence 166 to gain access to the respective network page 186. Specifically, the auto-navigate system 209 may simulate the various events such as keystrokes, cursor movements, mouse clicks, and other actions that the user originally employed to access the desired network page 186. In doing so, the auto-navigate system 209 performs various tasks required for authentication of a user to access the desired network pages 186 and the content contained therein 189.

In some situations, however, the network pages 186 may have changed in a manner such that the events recorded in the event sequence 166 no longer provide the desired access to the respective network pages 186. This is referred to as a sequence mismatch. Where the respective network pages 186 are no longer accessible, the auto-navigate system 209 generates and transmits an error message to the client 103 that informs the user of the failure to access a predefined network page 186 due to the sequence mismatch. The error message requests that the user rerecord the respective event sequence 166 in light of altered network pages 186 so that the desired network page 186 with the desired content items 189 may be accessed in the future. In such case, the user may be prompted to access a setup function of the publishing application 206 that transmits the recorder plug-in 163 to the client 103 to re-record the event sequence, etc.

Figure 2:
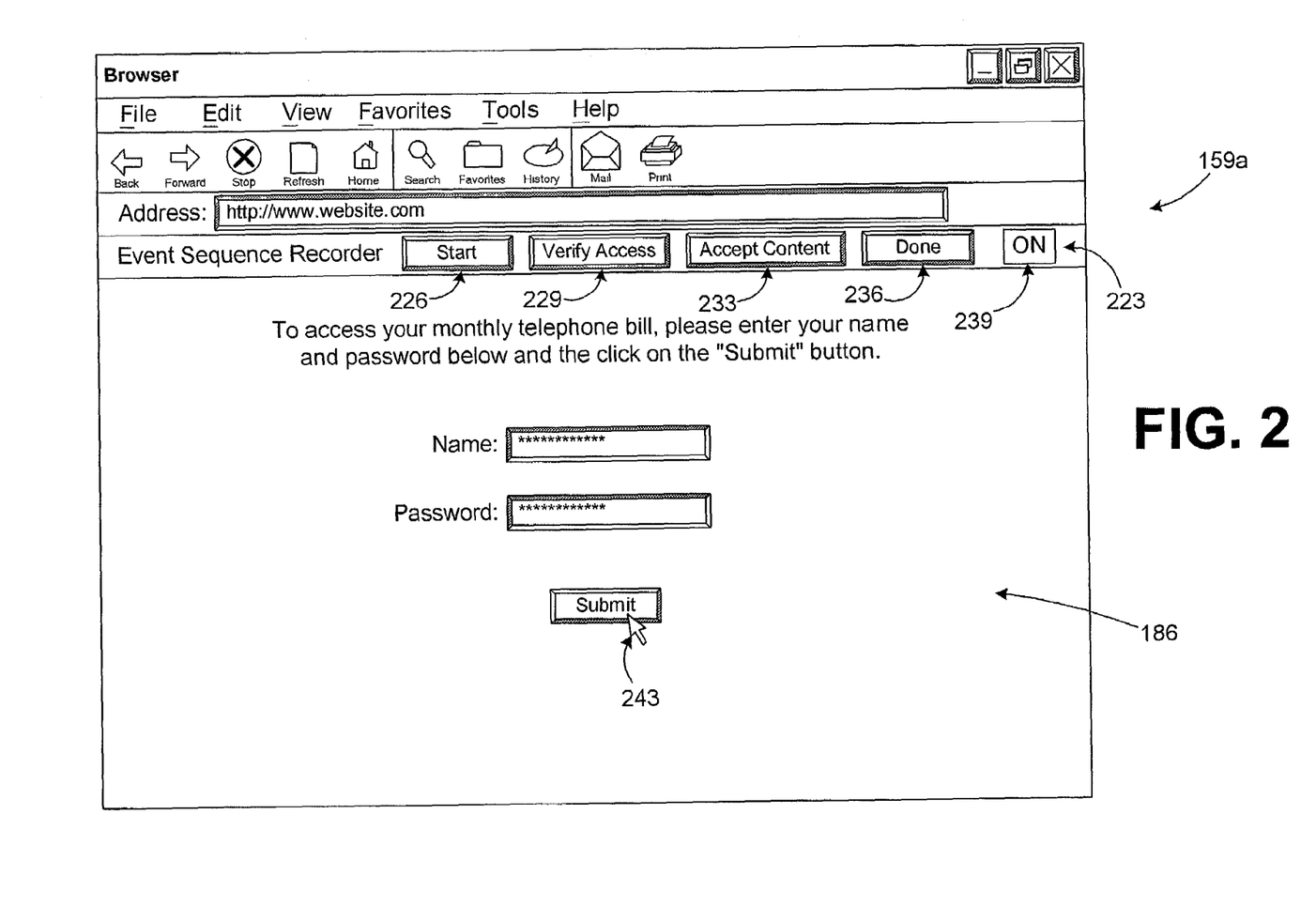
FIG. 2 is a drawing of a graphical user interface that is displayed on a display device in the client of FIG. 1.

With reference to FIG. 2, shown is the browser graphical user interface 159a that depicts a respective network page 186 along with an event sequence recorder bar 223. The event sequence recorder bar 223 includes a "Start" button 226, a "Verify Access" button 229, an "Accept Content" button 233, and a "Done" button 236. The event sequence recorder bar 223 also includes a status indicator 239. The event sequence recorder bar 223 is generated by the recorder plug-in 163 (FIG. 1) to allow a user to control the recording of an event sequence 166 to access a network page 186. The status indicator 239 indicates whether a recording session is on or off.

To begin a recording session, the user clicks on the Start button 226 while viewing a network page 186 that requires user authentication such as a password or otherwise presents hurdles through which the user must navigate in order to access a network page 186 with desirable content items 189. To "click" on a particular graphical element, a user places a cursor 243 over the element and presses a button on the mouse 139 or trackball, etc., as is generally known by those with ordinary skill in the art. Alternatively, the user may manipulate the start button 226 in some other manner as is known by those with ordinary skill in the art.

The status indicator 239 then changes the status indication from "OFF" to "ON". Thereafter, the user performs all tasks necessary to access the respective network pages 186. In doing so, various events occur that are recorded. During the recording session, if a network page is accessed that indicates that a user has been successfully authenticated and that a user now has access to protected network pages 186, the user may click on the Verify Access button 229 to create verification events in the event sequence 166. A verification event is one in which the auto-navigate system 209 is directed to verify that a particular network page 186 was successfully accessed upon entry of authentication information or by performing predefined tasks upon encountering some other hurdle. To facilitate verification of access to a particular network page 186, the content items 189 or portions of the content items 189 of the network page 186 are stored in the event sequence 166. These content items 189 or portions thereof may be employed to compare with the same content items 189 or portions thereof in the same network page 186 when it is accessed in the future by the auto-navigate system 209.

During the recording of the event sequence 166, if the user encounters a network page 186 that contains content items 189 that are to be accessed by the publishing application 206 for inclusion in an online publication, then the user may click on the Accept Content button 233. In response, a bookmark or other indicia is recorded in the event sequence 166 that indicates that the content item(s) 189 in the network page 186 currently displayed in the browser graphical user interface 159*a* is/are to be downloaded for the publishing application 206 to be included in an online publication. Once the last network page 186 has been accessed and the Accept Content button 233 has been clicked thereon, the user may click on the Done button 236 to signify the end of the event sequence 166. Thereafter, the event sequence 166 is then transmitted to the proxy server 109 for storage in the event sequence database 213.

Figure 3:
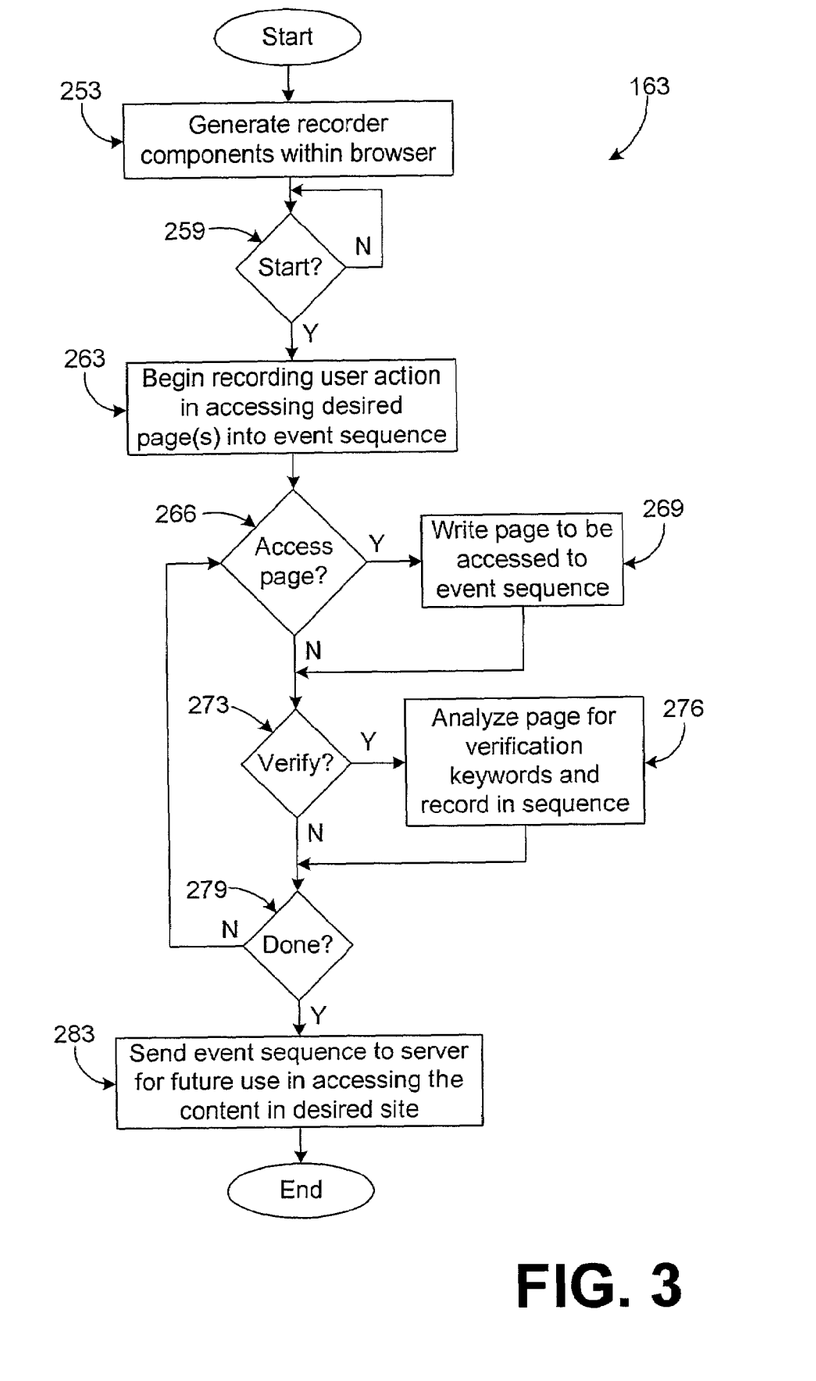
FIG. 3 is a flow chart of a recorder plug-in that is employed to record an event sequence in the client of FIG. 1.

With reference to FIG. 3, shown is a flow chart of the operation of the recorder plug-in 163 according to an aspect of the present invention. Alternatively, the flow chart of FIG. 3 may be viewed as depicting steps in a method implemented in the client 103 in generating an event sequence 166. The recorder plug-in 163 may be created using any appropriate computer language such as, for example, Java, C++, or other appropriate language. The recorder plug-in 163 may also be created in the form of an ActiveX control, etc.

Upon execution, the recorder plug-in 163 begins with box 253 in which the event sequence recorder bar 223 (FIG. 2) is generated within the browser graphical user interface 159*a* (FIG. 2). Thereafter, in box 259, the recorder plug-in 163 waits for the user to click on the Start button 226.

When the user does so, in box 263 the recorder plug-in 163 begins the recording of the user actions in accessing the desired network page 186 to obtain access to the content items 189 therein. Specifically, the recorder plug-in 163 enters a mode in which all events that occur during the course of the recording session are detected and stored in the event sequence 166. Thus, in box 266 the recorder plug-in 163 determines whether a particular network page 186 is to be noted in the event sequence 166 as a network page 186 to be accessed by the publishing application 206 to obtain the content items 189 included therein. This is determined by virtue of whether the user has clicked on the Accept Content button 233 (FIG. 2).

If such is the case, then the recorder plug-in 163 proceeds to box 269, otherwise the recorder plug-in 163 moves to box 273. In box 269, the uniform resource identifier or other bookmark associated with the respective network page 186 is stored in the event sequence 166 as a network page 186 that is to be accessed to obtain content items 189 therein for use by the publishing application 206 in generating the online publication. Thereafter the recorder plug-in 163 proceeds to box 273.

In box 273, the recorder plug-in 163 determines whether the user wishes that the current network page 186 that has been accessed is to be verified for access in the future by the auto-navigate system 209. Such may be the case, for example, to confirm that a respective network page 186 has been accessed after successful navigation through various hurdles presented. If the current network page 186 is to be verified as determined by virtue of the fact that the user has clicked on the verify access button 229 (FIG. 2), then the recorder plug-in 163 proceeds to box 276. Otherwise the recorder plug-in moves to box 279.

In box 276, the current network page 186 is analyzed for various content items 189 that may be employed to verify its future access. Specifically, the network page 186 may be analyzed for various key words or other content items that are stored in the event sequence 166. The key words may include, for example, "Welcome," "Successful Logon" or other phrase, etc. Such information may then be compared with the same information that is obtained when the network page 186 is accessed in the future by the auto-navigate system 209 to confirm that the hurdles presented to access such page were successfully navigated. The recorder plug-in 163 then proceeds to box 279.

Assuming that the recorder plug-in 163 has proceeded to box 279, then it is determined whether the recording session is complete by virtue of the fact that the user clicks on or otherwise manipulates the Done button 236 (FIG. 2). If not, then the recorder plug-in 163 reverts back to box 266. Otherwise, the recorder plug-in 163 proceeds to box 283.

In box 283, the event sequence 166 is transmitted to the proxy server 109 for storage in the event sequence database 213. There, the event sequence 166 is accessed in the future whenever the publishing application 206 desires to access the respective network pages 166 to obtain the content items 189 contained therein. After box 283, the recorder plug-in 163 ends as shown.

Figure 4:
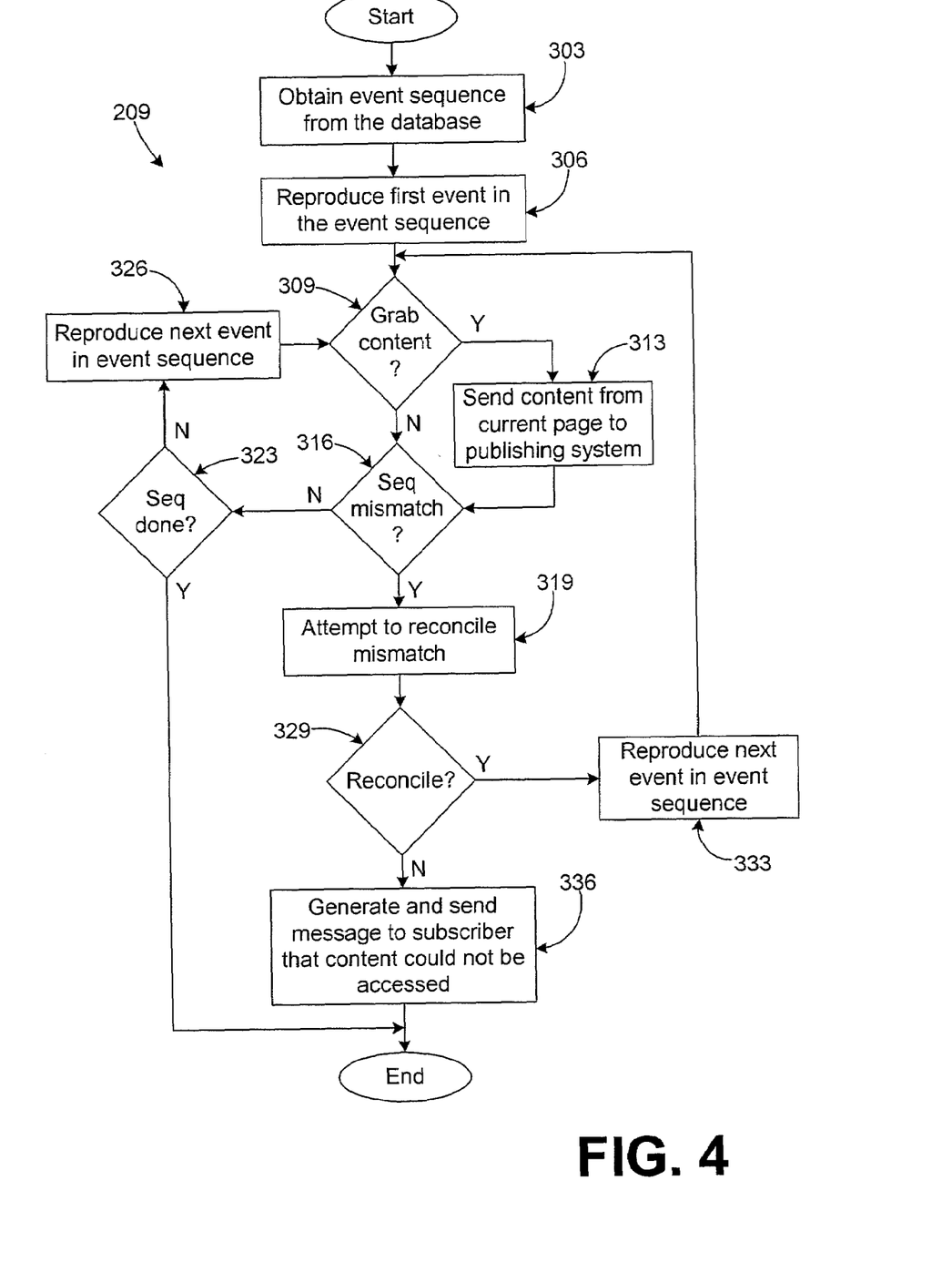
FIG. 4 is a flow chart of an auto-navigate system that is employed to obtain a network page located in the content server of FIG. 1.

With reference to FIG. 4, shown is a flow chart of the auto-navigate system 209 according to another aspect of the present invention. Alternatively, the flow chart of FIG. 4 may be viewed as depicting steps that are implemented in the proxy server 109. The auto-navigate system 209 is called or executed by the publishing application 206 (FIG. 1) to access a respective network page 186 (FIG. 1) for which hurdles exist preventing the publishing application 206 to directly access such network pages 186. The auto-navigate system 209 may be created using the computer languages discussed with reference to the recorder plug-in 163 (FIG. 3) or other appropriate languages.

Upon execution, the auto-navigate system 209 begins in box 303 in which an appropriate event sequence 166 (FIG. 1) is obtained from the event sequence database 213 (FIG. 1). The event sequence 166 obtained is that which is associated with the restricted network page 186 to which access is desired to obtain the content items 189 included therein. Next, in box 306, the auto-navigate system 209 reproduces the first event recorded in the event sequence 166. This may be, for example, a movement of the cursor 243 (FIG. 2) a keystroke on the keyboard 136 (FIG. 1), a manipulation of a component in the browser graphical user interface 159*a* (FIG. 1), or other action.

Then, in box 309, the auto-navigate system 209 determines whether the current event implemented entails accessing content items 189 included in the current network page 186 (FIG. 2) that was accessed. If such is the case, then the auto-navigate system 209 proceeds to box 313. Otherwise, the auto-navigate system 209 moves to box 316. In box 313, the content items 189 in the current accessed network page 186 are supplied to the publishing application 206 for inclusion in an appropriate online publication to be transmitted to the client 103 (FIG. 1). Thereafter, the auto-navigate system 209 proceeds to box 316.

In box 316, the auto-navigate system 209 determines whether a sequence mismatch has occurred such that a desired result or access that was expected in light of the current event sequence 166 has not actually occurred. This may be the case, for example, when one or more of the network pages 186 manipulated in the course of the event sequence 166 has changed or has been eliminated such that the event sequence 166 is no longer applicable. If such is the case, then the auto-navigate system 209 proceeds to box 319. Otherwise, the auto-navigate system 209 moves to box 323.

In box 323, the auto-navigate system 209 determines whether all of the events in the event sequence 166 have been reproduced such that the function of the auto-navigate system has completed. If such is the case, then the auto-navigate system 209 ends as shown. Otherwise, the auto-navigate system 209 moves to box 326 in which the next event in the event sequence 166 is reproduced. Thereafter, the auto-navigate system 209 reverts back to box 309. Thus, by virtue of blocks 309, 313, 316, 323, and 326, the auto-navigate system 209 performs the various actions necessary to navigate through various network pages 186 based upon the event sequence 166. At the same time, the auto-navigate system 209 determines whether a sequence mismatch occurred due to changes in the network pages 186 after the event sequence 166 was originally recorded.

With reference back to box 319, assuming that a sequence mismatch has occurred, then in box 319 the auto-navigate system 209 attempts to reconcile the mismatch. This may be done, for example, by searching a respective network page 186 to determine whether various elements such as links to be clicked or fields into which information is entered have been relocated on the network page 186. If such elements may be found in a different location, then the auto-navigate system 209 may reconcile the sequence mismatch by performing the needed tasks with such elements in their new location. In box 329, if the auto-navigate system 209 is able to reconcile the sequence mismatch, then the auto-navigate system 209 moves to box 333 in which the next event in the event sequence 166 is reproduced. Thereafter, the auto-navigate system 209 reverts back to box 309.

On the other hand, if the sequence mismatch can not be reconciled in box 329, then the auto-navigate system 209 proceeds to box 336 in which a message is generated and transmitted to the client 103 for display on the display device 133. The message informs the user that the desired content items 189 on a desired network page 186 can not be accessed to the fact that the network pages 186 associated with the event sequence 166 have changed and a sequence mismatch has occurred. The message further invites the user to re-record a new event sequence 166 in light of the changes so that proper access may be obtained to such content items 189 in the future. After block 336, the auto-navigate system 209 ends as shown.

Although the recorder plug-in 163 and the auto-navigate system 209 of the present invention are embodied in software or code executed by general purpose hardware as discussed above, as an alternative both may be embodied in dedicated hardware or a combination of software/general purpose hardware and dedicated hardware. If embodied in dedicated hardware, the recorder plug-in 163 and the auto-navigate system 209 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 3 and 4 show the architecture, functionality, and operation of an implementation of the recorder plug-in 163 and the auto-navigate system 209, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention. Also, the flow charts of FIGS. 3 and 4 are relatively self-explanatory and are understood by those with ordinary skill in the art to the extent that software and/or hardware can be created by one with ordinary skill in the art to carry out the various logical functions as described herein.

Also, where the recorder plug-in 163 or the auto-navigate system 209 comprise software or code, each may be embodied in any computer-readable medium for use by or in connection with an instruction execution system such as, for example, a processor in a computer system or other system. In this sense, the recorder plug-in 163 or the auto-navigate system 209 may comprise, for example, statements including instructions and declarations that can be fetched from the computer-readable medium and executed by the instruction execution system. In the context of the present invention, a "computer-readable medium" can be any medium that can contain, store, or maintain the recorder plug-in 163 or the auto-navigate system 209 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

I claim:

1. An automated data access method, comprising:
   identifying a content item to be accessed and included in a publication to be printed;
   identifying an event sequence associated with the content item that is employed to access the content item, wherein the event sequence includes at least one verification event, the at least one verification event comprising at least one task performed to verify successful access to a network page;
   manipulating a user interface component during the identifying of the event sequence to indicate that the content item successfully accessed is to be included in the publication that is to be printed; reproducing a number of events in the event sequence to obtain access to the content item, wherein the events of the event sequence comprise the entry of authentication information and the at least one verification event is performed after the entry of the authentication; and
   formatting the publication to include the content item for printing.

2. The method of claim 1, further comprising detecting a sequence mismatch while reproducing the events of the event sequence That precludes access to the content item.

3. The method of claim 2, wherein the step of detecting the sequence mismatch while reproducing the events of the event sequence that precludes access to The content item further comprises detecting an absence of an element in the network page.

4. The method of claim 2, wherein the step of detecting the sequence a mismatch while reproducing the events of the event sequence that precludes access to the content item further comprises detecting a failure to access a predefined page.

5. The method of claim 2, further comprising informing a user that the content item could not be accessed using the event sequence.

6. The method of claim 1, further comprising:
   detecting an absence of an element from a predefined location on the network page; and
   identifying the element in a new location on the network page.

7. The method of claim 1, further comprising transmitting a document that embodies the content item to a client for printing.

8. A computer program embodied in a computer readable medium for automated data access, comprising:
   code that identifies a content item to be accessed and included in a publication to be printed;
   code that identifies an event sequence associated with the content item that is employed to access the content item, wherein the event sequence includes at least one verification event, the at least one verification event comprising at least one task performed to verify successful access to a network page;
   code that generates a user interface component on a display device during the identification of the event sequence that is manipulated to indicate that the content item successfully accessed is to be included in the publication that is to be printed;
   code that reproduces a number of events in the event sequence to obtain access to the content item, wherein the events of the event sequence comprise an entry of authentication information and the at least one verification event is performed after the entry of the authentication information; and
   code that formats the publication to include the content item for printing.

9. The program embodied in a computer readable medium of claim 8, further comprising code that detects a sequence mismatch while reproducing the events of the event sequence that precludes access to the content item.

10. The program embodied in a computer readable medium of claim 9, wherein the code that detects the sequence mismatch while reproducing the events of the event sequence that precludes access to the content item further comprises code that detects an absence of an element in the network page.

11. The program embodied in a computer readable medium of claim 9, wherein the code that detects the sequence mismatch while reproducing the events of the event sequence that precludes access to the content item further comprises code that detects a failure to access a predefined page.

12. The program embodied in a computer readable medium of claim 9, further comprising code that informs a user that the content item could not be accessed using the event sequence.

13. The program embodied in a computer readable medium of claim 8, further comprising:
    code that detects an absence of an element from a predefined location on the network page; and
    code that identifies the element in a new location on the network page.

14. A system for automated data access, comprising:
    means for identifying a content item to be accessed and included in a publication to be printed;
    means for identifying an event sequence associated with the content item that is employed to access the content item, wherein the event sequence includes at least on verification event, the at least one verification event comprising at least one task performed to verify successful access to a network page;
    means for generating a user interface component on a display device during the identification of the event sequence that is manipulated to indicate that the content item successfully accessed is to be included in the publication that is to be printed;
    means for reproducing a number of events in the event sequence to obtain access to the content item, wherein the events of the event sequence comprise an entry of authentication information and the at least one verification event is performed after the entry of the authentication information; and
    means for formatting the publication to include the content item for printing.

15. The system of claim 14, further comprising means for detecting a sequence mismatch while reproducing the events of the event sequence that precludes access to the content item.

16. The system of claim 14, further comprising:
    means for detecting an absence of an element from a predefined location on the network page; and
    means for identifying the element in a new location on the network page.

17. A method for establishing automated data access to a network page, comprising:
    identifying a starting network page for an event sequence recording session;
    opening the event sequence recording session;
    recording a number of events that occur during an access of the network page that includes a content item to be included in a publication to be printed, wherein the events include an entry of authentication information to access the network page, and at least one of the events comprises a verification event, the verification event comprising at least one task performed to verify a successful access to the network page upon the entry of the authentication information; and
    manipulating a user interface component during the recording of the events to indicate that the content item in the network page successfully accessed is to be included in the publication that is to be printed.

18. The method of claim 17, further comprising storing the number of events as an event sequence.

19. The method of claim 17, wherein the step of recording a number of events that occur during the access of the network page further comprises recording a selection of the network page that is to be verified when accessed.

20. The method of claim 17, further comprising closing the event sequence recording session upon a selection of a last network page to be automatically accessed.

21. A computer program embodied on a computer readable medium for establishing automated data access to a network page, comprising:
    code that generates a set of event recording interface components on a display device, the event recording interface components including a user interface component that is manipulated to indicate that a content item in the network page currently accessed is to be included in a publication that is to be printed;
    code that opens an event sequence recording session at a starting network page in response to a start input;
    code that records a number of network page access events that occur during an access of the network page that includes the content to be included in the publication to be printed, wherein the network page access events include an entry of authentication information to access the network page, and at least one of the events comprises a verification event, the verification event comprising at least one task performed to verify a successful access to the network page upon the entry of the authentication information, wherein the verification event is recorded upon a manipulation of a verification one of the event recording interface components; and
    code that closes the event sequence recording session in response to a close input.

22. The program embodied on a computer readable medium of claim 21, further comprising storing the number of events as an event sequence.

23. The program embodied on a computer readable medium of claim 21, wherein the code that records the number of network page access events that occur during the access of the network page further comprises code that records a selection of an intermediate network page that is to be verified when accessed.

24. The program embodied on a computer readable medium of claim 23, wherein the code that records the selection of the intermediate network page that is to be verified when accessed further comprises code that records a number of elements in the intermediate network page to be verified in an event sequence.

* * * * *

UNITED STATES PATENT AND TRADEMARK OFFICE
CERTIFICATE OF CORRECTION

PATENT NO. : 7,113,301 B2  Page 1 of 1
APPLICATION NO. : 10/001411
DATED : September 26, 2006
INVENTOR(S) : Jason T. Su It is certified that error appears in the above-identified patent and that said Letters Patent is hereby corrected as shown below:

In column 11, line 25, in Claim 1, delete "the entry" and insert -- an entry --, therefor.

In column 11, line 27, in Claim 1, after "authentication" insert -- information --.

In column 11, line 32, in Claim 2, delete "That" and insert -- that --, therefor.

In column 11, line 35, in Claim 3, delete "The" and insert -- the --, therefor.

In column 11, line 39, in Claim 4, after "sequence" delete "a".

In column 12, line 42, in Claim 14, delete "on" and insert -- one --, therefor.

Signed and Sealed this

Eleventh Day of August, 2009

David J. Kappos
*Director of the United States Patent and Trademark Office*